(12) United States Patent
Vorm et al.

(10) Patent No.: US 12,298,284 B2
(45) Date of Patent: *May 13, 2025

(54) SYSTEM FOR SUBJECTING A SAMPLE TO CHROMATOGRAPHIC ANALYSIS

(71) Applicant: EVOSEP APS, Odense C (DK)

(72) Inventors: Ole Vorm, Odense C (DK); Nicolai Bache, Odense C (DK)

(73) Assignee: EVOSEP APS, Odense C (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/337,780

(22) PCT Filed: Sep. 26, 2017

(86) PCT No.: PCT/DK2017/050310
§ 371 (c)(1),
(2) Date: Mar. 28, 2019

(87) PCT Pub. No.: WO2018/059640
PCT Pub. Date: Apr. 5, 2018

(65) Prior Publication Data
US 2019/0250130 A1 Aug. 15, 2019

(30) Foreign Application Priority Data
Sep. 28, 2016 (DK) .......................... PA 2016 70766

(51) Int. Cl.
*G01N 30/60* (2006.01)
*G01N 30/04* (2006.01)
(Continued)

(52) U.S. Cl.
CPC ......... *G01N 30/6091* (2013.01); *G01N 30/04* (2013.01); *G01N 30/16* (2013.01);
(Continued)

(58) Field of Classification Search
CPC ...... G01N 30/60; G01N 30/16; G01N 30/201; G01N 30/34; G01N 2030/207;
(Continued)

(56) References Cited

U.S. PATENT DOCUMENTS 4,204,952 A 5/1980 Snyder
5,057,437 A 10/1991 Binder
(Continued)

FOREIGN PATENT DOCUMENTS

CN 102961892 A 3/2013
EP 1265067 A1 12/2002
(Continued)

OTHER PUBLICATIONS

Falkenby et al. "Integrated Solid-Phase Extraction—Capillary Liquid Chromatography (speLC) Interfaced to ESI-MS/MS for Fast Characterization and Quantification of Protein and Proteomes" (J. Proteome Res. Oct. 3, 2014, 13, p. 6169-6175) . (Year: 2014).*
(Continued)

*Primary Examiner* — Ryan B Huang
(74) *Attorney, Agent, or Firm* — Ruggiero McAllister & McMahon LLC

(57) ABSTRACT

There is provided a system for separation of analytes in a solution. The system encompasses a disposable cartridge enclosing a sorbent for binding the analytes in a solution and a conduit establishing a fluid link to a valve having a holding-loop to achieve elution through the cartridge at low pressures. The valve is switchable to a position following the elution from the cartridge for emptying through an outlet port at high pressures such as those required for moving liquid through chromatographic columns.

26 Claims, 4 Drawing Sheets

(51) Int. Cl.
*G01N 30/16* (2006.01)
*G01N 30/20* (2006.01)
*G01N 30/34* (2006.01)

(52) U.S. Cl.
CPC ....... *G01N 30/34* (2013.01); *G01N 2030/201* (2013.01); *G01N 2030/202* (2013.01); *G01N 2030/207* (2013.01)

(58) Field of Classification Search
CPC ........ G01N 30/04; G01N 30/20; G01N 30/32; G01N 2030/201; G01N 2030/202; B01D 15/14; B01D 15/163; B01D 15/242
See application file for complete search history.

(56) References Cited

U.S. PATENT DOCUMENTS

| | | | |
|---|---|---|---|
| 6,237,396 B1 | 5/2001 | Durand et al. | |
| 7,699,990 B2 | 4/2010 | Deguchi et al. | |
| 8,048,312 B2* | 11/2011 | Deguchi ............ | G01N 35/1097 210/656 |
| 2004/0124128 A1 | 7/2004 | Iwata | |
| 2008/0156080 A1 | 7/2008 | Balgley | |
| 2009/0166525 A1 | 7/2009 | Hughes | |
| 2012/0262178 A1 | 10/2012 | Dourdeville et al. | |
| 2014/0014585 A1* | 1/2014 | Dourdeville ........... | G01N 30/04 210/656 |
| 2015/0177199 A1 | 6/2015 | Borbely et al. | |
| 2015/0198571 A1 | 7/2015 | Vorm | |
| 2016/0203965 A1* | 7/2016 | Rorick ................... | G01N 30/95 250/288 |
| 2016/0238573 A1 | 8/2016 | Venkatramani et al. | |
| 2017/0322187 A1* | 11/2017 | Thielsch ................ | B01D 15/12 |
| 2018/0052141 A1 | 2/2018 | Stoll et al. | |
| 2019/0170706 A1 | 6/2019 | Gilar et al. | |
| 2019/0250130 A1 | 8/2019 | Vorm et al. | |
| 2020/0406165 A1 | 12/2020 | Dlugasch et al. | |

FOREIGN PATENT DOCUMENTS

| | | |
|---|---|---|
| EP | 2818860 A1 | 12/2014 |
| JP | 11-271291 A | 10/1999 |
| JP | 2000-074898 A | 3/2000 |
| JP | 2015-206740 A | 11/2015 |
| WO | 2006/104905 A1 | 10/2006 |
| WO | 2007/092827 A2 | 8/2007 |
| WO | 2007/092827 A3 | 8/2007 |
| WO | 2009/098125 A1 | 8/2009 |
| WO | 2009/098125 A8 | 8/2009 |
| WO | 2011/129827 A1 | 10/2011 |

OTHER PUBLICATIONS

International Search Report and Written Opinion from International Application No. PCT/DK2017/050310, mailed Dec. 7, 2017.
Hoerning et al. (2008). Isocratic solid phase extraction-liquid chromatography (SPE-LC) interfaced to high-performance tandem mass spectrometry for rapid protein identification. Journal of proteome research, 7(8), 3159-3167.).
Falkenby et al. (2014). Integrated Solid-Phase Extraction-Capillary Liquid Chromatography (speLC) Interfaced to ESI-MS/MS for Fast Characterization and Quantification of Protein and Proteomes. Journal of proteome research, 13(12), 6169-6175.).
Hoerning et al. (2007). Solid phase extraction-liquid chromatography (SPE-LC) interface for automated peptide separation and identification by tandem mass spectrometry. International Journal of Mass Spectrometry, 268(2), 147-157.).
Binai et al. (2014). Rapid Analyses of Proteomes and Interactomes Using an Integrated Solid-Phase Extraction—Liquid Chromatography—MS/MS System. Journal of proteome research, 14(2), 977-985.
Dolan, LCGC North America-Jul. 1, 2016, vol. 34, Issue 7 pp. 472-478.
Bentayeb et al., "Determination of bile acides in human serum by on-line restricted access material-ultra high-performance liquid chromatography-mass spectrometry," Journal of Chromatography B, 2008, 869:1-8.
Songgang et al., "Screening of potential active anti-cancer components of Brucea javanica by SMMC-7721 and Hep-G2 comprehensive two dimentional CMC-monolith chromatography," Journal of Pharmaceutical Practice, 2014, 32(6) 4 pages).
Marino et al., "Characterization and usage of the EASY-spray technololgy as part of an online 2D SCX-RP ultra-high pressure system," Analyst, 2014, 139:6520-6528.
Supplementary European Search Report for EP Application No. 17855061 mailed May 7, 2020 (6 pages).
European Office Action for EP Application No. 17855061.2 malied Dec. 1, 2021 (6 pages).
Chinese Search Report for CN Application No. 201780070245.3 mailed Jun. 16, 2022 (2 pages).
Chinese Search Report for CN Application No. 201780070245.3 received Aug. 26, 2021 (3 pages).
Chemical Engineering & Equipment, 2016, pp. 188-191.
Modern Instrumental Analysis—3 pages. (from CN Office Action).

* cited by examiner

SYSTEM FOR SUBJECTING A SAMPLE TO CHROMATOGRAPHIC ANALYSIS

This application is a National Stage Application of International Application No. PCT/DK2017/050310, filed 26 Sep. 2017, which claims benefit of Serial No. PA 2016 70766, filed 28 Sep. 2016 in Denmark, and which applications are incorporated herein by reference. To the extent appropriate, a claim of priority is made to each of the above disclosed applications.

FIELD OF THE INVENTION

The present invention generally relates to the field of solid phase extraction as such or prior to chromatographic analysis of samples and, more specifically, to the handling of the sample during such analysis.

BACKGROUND OF THE INVENTION

When analyzing chemicals and bio-molecules it is very common to separate mixtures of compounds into their individual species in order to simplify a subsequent detector response. That is, detector measurements on mixtures often yield results that cannot be interpreted whereas measurements on the constituents made separately can be readily interpreted. One of the most widely used techniques for separating mixtures of compounds into simpler mixtures is chromatographic separation. In chromatography, samples containing different chemical compounds are separated in time and space based on a difference in some physico-chemical property of each compound. As a simple example can be mentioned "size exclusion chromatography" where components are separated on the basis of differential molecular size. This is accomplished by passing a liquid (i.e. a mobile phase) that contains the sample mixture through a conduit that contains a chromatography material (i.e. a stationary phase). The chromatography material in this case is typically porous beads where large molecules are forced with the mobile phase on the short path around the beads whereas smaller molecules follow the mobile phase through increasingly narrow pores and therefore get delayed relative to the large molecules. The wanted effect in size exclusion chromatography is that the smallest compounds traverse a length of capillary pathway more slowly than large compounds and therefore are delivered at the exit end of the capillary pathway with a time delay that is inversely proportional to their size. Many other types of chromatographic separation exist, each taking advantages of a difference in the physic-chemical properties between different compounds. The liquid may be moved through a capillary pathway by pressure or electrostatic forces, or both.

Fractions of the sample may be analyzed by several methods, but mass spectrometry is a very frequently used analyzer in connection with chromatography in general and it is almost invariably the method of choice for analysis of biomolecules such as proteins, peptides, and most metabolites following separation by liquid chromatography.

Both mass spectrometers and chromatography systems are relatively expensive instruments to deploy and maintain wherefore it is essential that they produce as much data per unit time as possible; i.e. LC-MS is a time critical process owing to the cost of the used equipment.

But a more important consideration than cost is usually the consideration of the analytical sensitivity of LC-MS analysis because many analyses must be performed on limited material that yields a low signal response and would cause an analysis to entirely fail if the necessary sensitivity is not obtained. One of the most important means to optimize sensitivity in LC-MS is to downscale the chromatographic parameters of column diameter and flow-rate as explained herein. Over the recent twenty years, or so, the chromatography variant called "nano-flow" LC has become established for separation of proteins and peptides prior to MS analysis. This technique usually uses flow-rates between 200 nL/min and 400 nL/min and column diameters around 75 µm. This provides high analytical sensitivity, however, the low flow rates also mean that the cycle time for a nano-flow LC-MS analysis is high and simple household steps during which no data is recorded by the mass spectrometer take up a significant amount of time. These steps are predominantly the loading of the sample mixture onto the column and subsequent de-salting of the loaded sample with a pure solvent.

In order to retain the high analytical LC-MS sensitivity of nano-flow LC while significantly reducing the cycle time of the analysis, attempts have been made to build miniaturized solid phase extraction LC systems (SPELC) where pipette tips with immobilized sorbent are used as disposable chromatographic trapping columns on which samples can be loaded and de-salted prior to insertion into the SPELC system. This offers the advantage that the household steps of loading and de-salting are largely removed from the overall cycle time of the LC-MS analysis while small flow rates may still be used during the separation.

Prior art SPELC systems (ref 1-5) use direct elution through the sorbent containing pipette tip into a conduit that leads directly to a chromatographic separation column where said column causes a high back pressure when a forward flow is generated. I.e. the elution through the tip requires a notable liquid pressure in order to happen, which in turn leads to issues concerning leaks that form immediately before and after the pipette tip, such that elution through the tip ends up being incomplete and/or irreproducible.

The system described by Knierman et al (ref. 1) proposed to overcome leaking by carefully designing a funnel-shaped recipient socket that formed a snug fit with the outer surface of the pipette tips. This tight fit, combined with a relatively high force used to connect the pipette tip into the socket, was sufficient in theory to overcome the pressure requirement at low flow rates and is an obvious solution to the leakage problem. However, experimental data are not at hand because the system was never reduced to practice.

The system described by Hoerning et al (ref. 2) tried to overcome leaking by using ultra-low flow rates, typically 30 nL/min to 50 nL/min for the elution and separation in combination with a relatively high force holding the pipette tips into a tubular recipient socket. This approach of reducing flow rates to extremely low levels was chosen in order to proportionally reduce the generated back pressure (i.e. the pressure needed for forcing liquid directly through the separation column) and thereby remedy the leakage problem. While the proposed solution was obvious and theoretically simple, it was technically difficult in practice to generate such low flow rates reproducibly and also the low flow rates caused each analysis to be slower than desired. So while this approach worked most of the time, the failure rate was high.

The prior art system described by Falkenby et al. (ref. 4 and used in ref. 5) attempted to overcome leaking by the simple application of brute force, i.e. forcing the pipette tip into the recipient socket a high force. This was performed in practise by using a needle made of high-tension ceramics on the one side of the pipette tip and a stainless steel socket on the other side, where the socket was positioned on a strain gauge that allowed careful monitoring and control of the applied force. This straightforward solution could at times form leak tight connections across the pipette tips up to 300 bar liquid pressure, but the very high sealing forces that were applied would regularly damage the relatively soft plastic tips, e.g. press the tips to a point where the exit opening would become blocked. Hence this approach also exhibited a failure rate that was too high.

All prior art systems have attempted to overcome leakage by focusing on the pressure, either by reducing the liquid pressure (by reducing flow rate) or by sealing better around the soft plastic tips in order to withstand the high pressure. These attempted solutions were in theory the most obvious and attractive solutions from a chromatographic performance perspective since they could be made while keeping the sorbent of the pipette tip directly in-line with the sorbent of the separation column, which in principle was required in order to minimize swept volumes between the tip and the column. Thus, all three prior art systems tried to minimize swept volume in order to obtain optimal chromatographic resolution and shorten the analysis time.

The present invention describes a somewhat different approach to overcoming the leakage problem by inserting a switchable loop in-between the pipette tip and the separation column such that samples are eluted in a first step from the pipette tip into the loop and in a second step from the loop onto and through the separation column. This approach effectively solves the leakage problem of prior art systems if the loop is configured such that it has low flow resistance, but this approach also considerably increases the swept volume between the tip and the separation column, and therefore it should intuitively cause reduced chromatographic resolution and require longer analysis time (since the liquid must travel longer). However, what is less obvious is that the disconnection of the tip and the column (by the switchable loop) also leads to two new advantages, namely that: i) high flowrates can be used to move sample from tip to loop without causing high back pressure because the loop has low flow resistance, and hence this step can be very fast; and ii) once the loop is switched in-line with the separation column, there is no longer connection to the tip and therefore chromatographic resolution can be regained in several other ways, e.g. using long columns despite the high back pressures they require; using a phase shift, or modifying the mobile phase after the tip but before the column.

Surprisingly, while the present invention introduces an additional swept volume that is around two orders of magnitude higher than was the case in the prior art systems and relies on additional means to regain high resolving power, it turns out that the desired chromatographic performance is now far easier to obtain in practice.

It is an object of this invention to provide an improved sample-handling system suitable for automatic handling of small disposable sorbent containing cartridges into and out of a capillary pathway.

SUMMARY OF THE INVENTION

The present inventors have found it superior to prior art systems to elute through the tip and into an open loop or onto a relatively short trapping column that produce little or no back pressure. The loop (or trapping column) is positioned across a shear valve and only after the elution has finished will the shear valve turn and thereby disconnect the tip and place the loop (or trapping column) in-line with the separation column. This completely overcomes the need for elevated liquid pressure in order to elute through the tip and into subsequent conduits and therefore it removes any technical issues concerned with leakages between the needle, tip and recipient socket.

The inventors have conceived that while the use of a loop or low-back pressure trapping column as alternative to direct loading onto a separation column removes leaking issues, this solution may create another problem, because the analytes eluted from the pipette tips tend to be dispersed in a relatively large volume and consequently the chromatographic resolution will suffer. Hence, elution from the tip into a loop, followed by a valve shift, and then separation through a chromatographic column will lead to poor chromatography unless steps are taken to re-gain good resolving power.

The present inventors have contemplated two means by which the resolving power may be regained in steps following the elution through the pipette tips:
1. Use of a phase shift, i.e. using a pipette tip chemistry that is "orthogonal" or "reverse" to the chemistry of the separation column, and/or
2. Dilution (modification) of the liquid phase that elutes analytes from the pipette tips at a point that is downstream of the tip but upstream of the separation column.

Both of these approaches will cause each analyte species to refocus on the early part of the separation column, and if analytical parameters are chosen well, each approach will allow for the full resolving power of the separation column to be obtained.

These and other objects are accomplished by the present invention, wherein a system for separation of analytes in a solution is provided. The system comprises the following features:
a cartridge enclosing a sorbent for binding the analytes in the solution
a recipient socket for receiving the cartridge, and allowing a fluid to flow through the cartridge into the recipient socket, thereby eluting the analytes into the recipient socket;
a conduit in fluid communication with the recipient socket, said conduit establishing a fluid link to a valve or via a coupling conduit into the valve, said valve providing access to a holding-loop with or without sorbent, wherein said holding-loop provides low flow resistance at flow rates of between 200 nL/min and 100 µL/min enabling elution through the cartridge at pressures of between 1 bar and 50 bar into a waste reservoir; wherein the valve is switchable to a position following the elution from the cartridge for emptying through an outlet port at pressures of between 1 bar and 3000 bar at flow rates of between 50 nL/min and 10 µL/min; and
optionally a chromatographic column in fluid communication with the outlet port, said column provided with a sorbent having a chemical composition that is matched with the binding material of the cartridge such that at least some of the analytes eluted from the cartridge will bind to said chromatographic column.

The cartridge is preferably a pipette tip with chromatographic resin embedded and fixated therein. Alternatively a tube may be used, wherein its inner and/or outer surfaces may be cylindrical, conical, spherical or any combination thereof. Further a planar disc may be used as cartridge.

Typically the chromatographic column contains C18 reversed phase material, and in order to ensure adequate mismatch (necessary for refocusing) the sorbent of the cartridge is typically selected from: hilic, SCX, SAX, cellulose, antibodies and derivatives thereof.

In a preferred embodiment the system may further include one or more pumps that can supply a liquid at any point in-between the recipient socket and the chromatographic column such that the eluent composition may be modified so that at least some of the analytes eluted from the cartridge will bind to the chromatographic column preferably to being dissolved in the modified eluent.

The modification of the eluent flowing from the cartridge may be achieved by introducing one or more pumps at various sites in the fluid line, such as integral to the recipient socket, between the recipient socket and the conduit, between the conduit and the valve port, between the inlet valve port and outlet valve port or between the outlet valve port and the sorbent of the holding-loop or chromatography column.

BRIEF DESCRIPTION OF THE DRAWINGS

The above, as well as other advantages of the present invention, will become readily apparent to those skilled in the art from the following when considered in the light of the accompanying drawings.

DETAILED DESCRIPTION OF THE INVENTION

Figure 1:
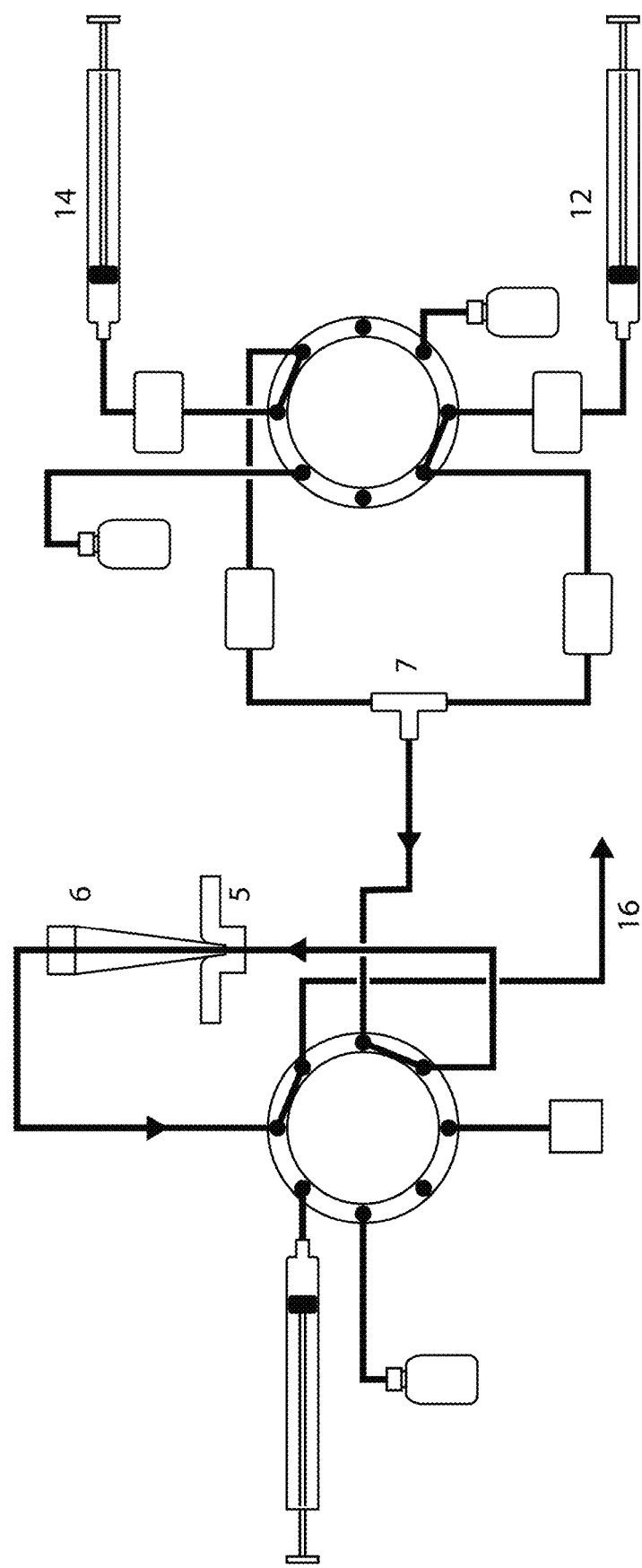
FIG. 1 is a plan view of a system of the prior art.

The above, as well as other advantages of the present invention will become readily apparent to those skilled in the art from the following detailed description of preferred embodiments when considered in the light of the accompanying drawings. The present invention relates to the following aspects:

1. Elution from disposable cartridge (pipette tip) into a loop or trapping column rather than directly onto a separation column in order to use lower pressure and thereby avoid leakages before and after the cartridge. This however leads to greater swept volumes and dead volumes in the path of eluted analytes (going towards the separation column) and therefore causes peak broadening (i.e. reduced resolving power) in the chromatographic separation.
2. Use of phase shift between the disposable cartridge and the downstream separation column in order to cause analytes to re-focus when they reach the top of the separation column. This is achieved e.g. using two (or more) different binding chemistries such that the buffer composition, which elutes a given analyte from the disposable cartridge surface (of one chemical composition), is not a sufficiently strong solvent to keep said analytes in solution when reaching the next column surface wherefore the analytes will bind to said second surface (of a second chemical composition).
3. Dilution (or modification) of the elution buffer at a point in-between the disposable cartridge and the separation column in order to cause analytes to re-focus when they reach the top of the separation column. That is, even if the cartridge and the separation column have similar or identical binding characteristics (chemical composition), analytes can be caused to bind again if the elution buffer has been modified (diluted) in a manner that causes the equilibrium of bound versus unbound analyte to be shifted towards surface binding.

It is technically challenging to seal properly on either side of the disposable cartridge if the elution pressure is high. A low pressure elution according to the present invention is a very robust approach and may only suffer from peak broadening it may cause. The robustness is vastly increased by operating at low pressure (say 1-10 bar) rather than high pressure (say, 50-500 bar). Robustness is of pivotal importance for the end-user as it greatly increases reliability and longevity of the instrument, reduces maintenance needs, and increases certainty that data can be obtained for a given sample at any given time point.

The two means of the present invention to overcome the peak broadening (that may result from eluting into a loop or onto a low-resistance trapping column) are valuable because the resolving power of the overall chromatographic process needs to be a high as possible in order to get the best possible mass spectrometry data. Co-eluting analytes will reduce the amount of time the MS has for accumulating ions of each analyte and may lead to poor signal-to-noise ratios in such spectra. Further, electrospray ionisation mass spectrometry has a sensitivity that is concentration dependent (not depending on total mass flow) which means that the highest intensity signal is obtained when each analyte is eluted in the highest concentration possible, i.e. when each analyte is eluted in the smallest possible volume of liquid.

Disposable cartridges containing a sorbent that binds analytes of interest must have a simple design that can be manufactured reliably but cheaply. A typical manufacturing process of choice would be a single-step injection-moulded cartridge case made of a plastic, e.g polypropylene. Re-usable sorbent containing elements (i.e. chromatography columns) may have much more elaborate design and be manufactured in lengthy multi-step processes but disposable items need to be cheap to manufacture.

For high-sensitivity analysis it is often advantageous to keep the sorbent volume small, i.e. few µL or below, and have fluid connections to and from the sorbent be both short and narrow. This is challenging to accomplish with cartridge designs that contain a large volume of plastic and injection moulding narrow passages that are physically stable under pressure is also challenging. Therefore it is altogether difficult to make disposable sorbent cartridges with small sorbent volumes that can be clamped between a connector that delivers fluid to the cartridge and a connector that leads fluid from the cartridge without leaking on either side of the cartridge. If the clamping force is increased in order to seal better, then the cartridge itself may get damaged or conduits inside the cartridge may change size. Re-usable chromatography columns have neatly prepared sealing surfaces at each end that mate with connecting surfaces that are held in place at very high force, usually using threaded connectors, which under ideal circumstances makes it routine to obtain virtually leak free connections at pressures up to 1,500 bar.

Sorbent containg cartridges having the form of pipette tips with immobilized resin at the narrow end of the tip have proven cheap to manufacture while having the small bed volume necessary for sensitive analysis and have therefore found widespread use in manual separation protocols. As pipette tips furthermore have a wide opening at one end, which allows loading of large volumes of liquid (up to 200 µL for popular sizes), these tips are near ideal for fast and sensitive clean-up steps and have become widespread in use.

These tips are however not easy to clamp or seal around such that they may be used in an automated manner at high elution pressure. Earlier implementations of robotic devices that could seal around a Stagetip are described in references 2-4. Due to the high clamping force used in these prior art devices, undesirable material deformation of the tip and the sorbent therein has been observed.

In accordance with the present invention, clamping issues have been overcome by reducing the pressure required to move liquid through the cartridge due to low flow restrictions. The concept of the present invention is that the elution is not made in-line with a separation column (which is typically a component that presents a high restriction to the flow of liquid) but should be made in-line either with an empty loop or a very short trapping column, and only once the elution from the cartridge is completed, the loop or trapping column is placed in-line with the separation column while the connection back to the cartridge is broken. This may easily be done with a switching valve, such as a two-position, six-port shear valve; but the required change of connections may also be implemented by using shear valves of other configurations, or needle valves, or other valve technologies.

FIG. 1 shows a prior art set-up, wherein the disposable cartridge (6) is held by a robotic device (not shown) in the recipient socket (5) using high pressure in order to create a high sealing force. This is necessary because the fluid stream that is delivered by the gradient pumps (14 and 12) through the mixing tee (7) is eluting through the cartridge into a conduit that is in fluid connection with a separation column (16) which causes high backpressure. Leaks therefore occur between the recipient socket (5) and the cartridge (6) and also between the cartridge and any conduits otherwise connected/held to it.

Figure 2:
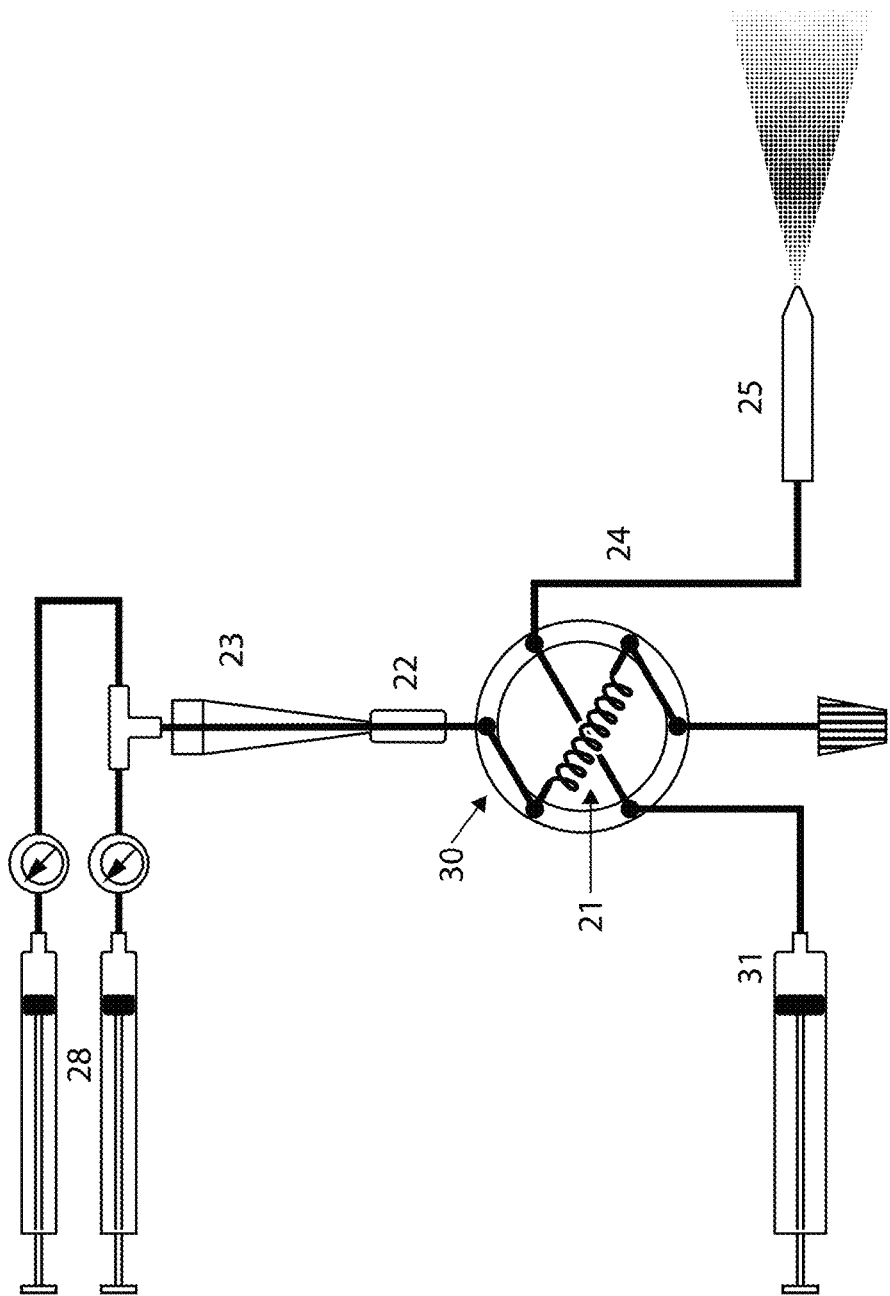
FIG. 2 is a plan view of the present invention.

The concept of the present invention is shown in FIG. 2. The disposable cartridge (23) is held by a robotic device (not shown) into a recipient socket (22) using only very low mechanical force, and the flow that is delivered by the pumps (28) in order to elute analytes from the cartridge is under low pressure. This is possible because the recipient socket is in fluid connection with a holding loop (21) that causes little resistance to the fluid flow. As an alternative implementation of the present invention, the holding loop (21) could be replaced by a trapping column (not depicted in FIG. 2 but shown in FIG. 3 as example) as long as that also does not cause substantial resistance to the flow. When the analytes of interest have been transferred from the cartridge to the holding loop (or trapping column) then an actuator will turn the shear-valve (30) and thereby disconnect the loop from the cartridge and instead put the loop in fluid connection between a high pressure pump (31) on the one end, and a conduit leading towards the detector (24) on the other end. The flow through the loop may now occur at the much higher pressure that is necessary to force the liquid through a chromatographic separation column (25) on its way to a detector. Leaks will now usually not be an issue because no disposable or soft plastic components are now in-line with the high pressure fluid.

It should also be noted, that as soon as the valve has turned and thereby disconnected the fluid connection between the loop and the cartridge, the cartridge can be disposed and replaced by a new cartridge, containing a new sample, by the robotic system such that elution from the new cartridge may happen as soon as the chromatographic analysis of the first sample is concluded and the valve switches back.

As shown in ref 4 (Falkenby et al. in 2014), it is possible to use a disposable cartridge as pre-column and still obtain an adequate resolving power from a downstream separation column if the swept volumes and dead-volumes between the cartridge and the separation column are appropriately minimised and optimised. While this process may require some effort and the effect is limited, it is technically the simplest concept.

Eluting from a cartridge and into a loop or onto a trapping column (that has a high width/length-ratio) and then flushing from the loop or trapping column (as the case may be) and onto the separation column will inherently lead to significant increases in swept volume and most likely also dead-volumes.

In order to preserve resolving power in a system of the present invention, the present inventors have found two ways by which the lost resolution may be re-established. These are discussed below:

1) The chemistries of the sorbent in the cartridge and the sorbent in the separation column must be matched such that the eluent that elutes analytes off the cartridge sorbent is not able to maintain these analytes in solution once they reach the separation column sorbent. This means that even if analytes come off the cartridge in a relatively large volume and get further dispersed on the way to the separation column, then the separation column sorbent will bind analytes readily at the top of the column which will serve to re-focus the analytes in a small well-defined volume; and 2) It is possible to chemically modify the eluent composition at a point that lies in-between the cartridge exit and the separation column entrance such that, even if analytes come off the cartridge in a relatively large volume and get further dispersed or diluted on the way to the separation column, then the separation column sorbent will bind analytes readily at the top of the column which will serve to re-focus the analytes in a small well-defined volume.

Re 1.)

Separation columns used e.g. for separation of proteins, peptides, other large biomolecules, small molecules such as metabolites and many other compounds are often based on chromatographic material that exhibit differential binding characteristics on the basis of the hydrophobicity (opposite of hydrophilicity) of the analytes to be separated. As an example, so-called "C18 columns" bind hydrophobic compounds better than it binds hydrophilic compounds and in order to separate a mixture of analytes one would normally change the eluent composition flowing through the column over time such that it forms a so-called gradient, i.e. starts by being mostly if not all aqueous and gradually becoming more if not all organic phase (e.g. methanol or acetonitrile).

However, other sorbent chemistries exist that bind analytes on the basis of chemical or physical binding that is markedly different from the popular C18 chromatography material. As examples of such other chemistries can be mentioned: cellulose, cation-exchange material (SCX), anion-exchange material (SAX), Hilic (that binds almost reversely of C18) but many more exist.

The present invention proposes that the cartridge sorbent chemistry be chosen such that a given eluent may be able to elute the analytes of interest while that same eluent will allow the analytes (or a portion thereof) to resorb on the separation column. With the appropriate choices of cartridge sorbent, eluent, and separation column sorbent, it will be possible to elute virtually all analytes of interest from the cartridge but also having the separation column bind virtually all of them again until the separation column is exposed to an appropriate gradient. I.e. what is a well-chosen elution buffer for the cartridge is a well-chosen loading buffer for the separation column.

As a specific example of well matching chemistries that will re-focus analytes eluted in a large volume can be mentioned cartridges with sorbent based on Hilic material combined with a separation column of C18. Hilic releases, for instance many (if not most) peptides in an eluent of pure water, whereas as a downstream C18 column will bind most peptides and only readily release these as the gradient changes from water to 40% organic eluent.

The simple setup that is shown in FIG. 2 can readily be used for the proposed analysis provided the chemical phases of the cartridge and the column are appropriately matched.

Figure 3:
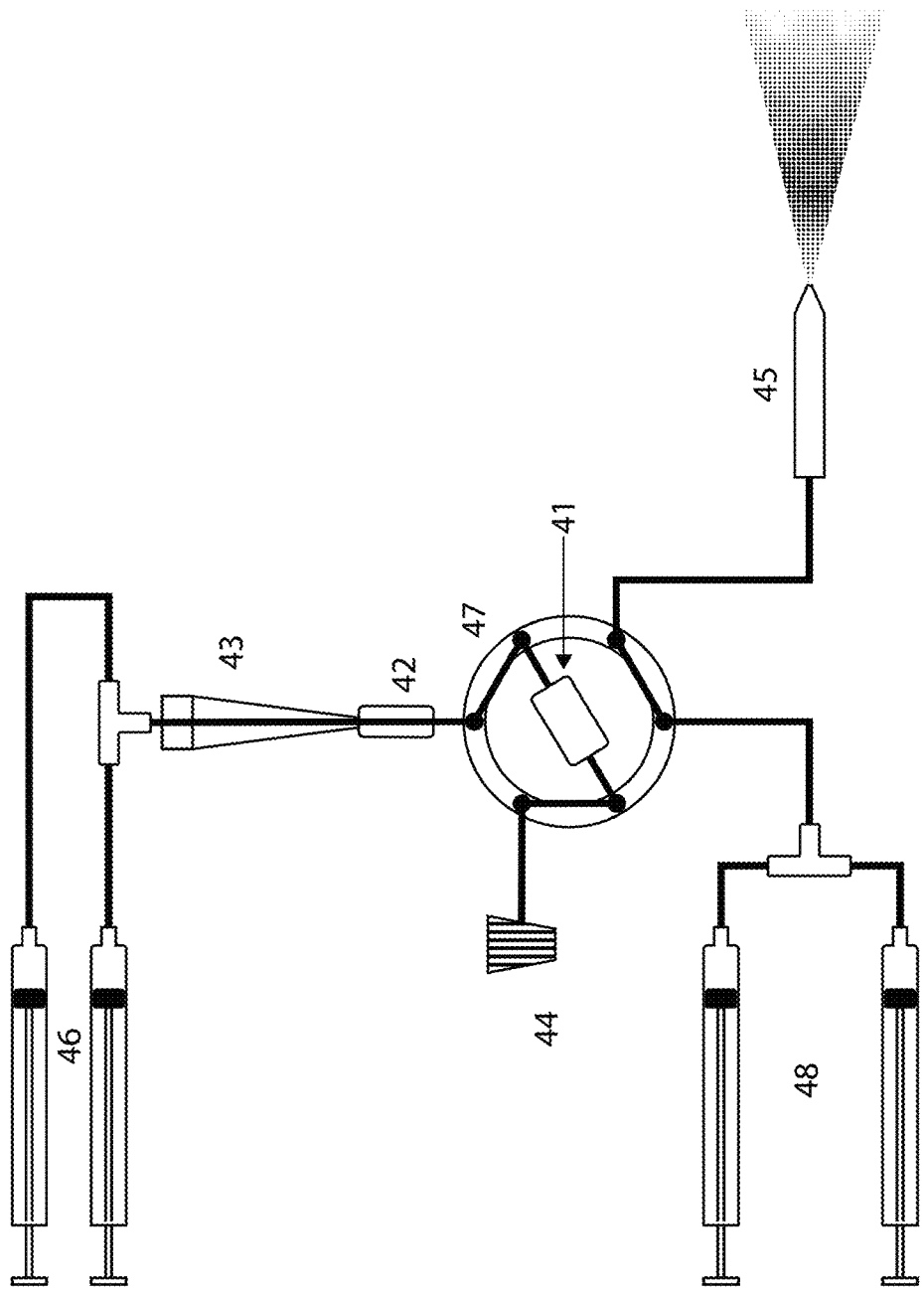
FIG. 3 is plan view of the present invention using a trapping column instead of a loop to capture the analytes.

The slightly different setup shown in FIG. 3 is using a trapping column (41) instead of a loop to capture the analytes which also is an implementation in accord with the present invention with the difference that the chemistry of the cartridge (43) and the trapping column must then be matched. Most often the trapping column will have chemistry that identical or similar to the subsequent separation column (45); but in one variant of the invention there is no separation column and the analytes are not separated beyond the separation yielded by the trapping column. Using a trapping column rather than a loop may require slightly higher pressure in order to elute from the disposable cartridge but has the advantage that an eluent, from a first pump or set of pumps (46) running through the cartridge and through the trap can get shunted to a waste container (such as item 44 in FIG. 3). This is advantageous if the system for instance is connected to a mass spectrometer in order to analyse the analytes and where one desires to use a cartridge chemistry and eluent that is incompatible with mass spectrometry. One such example would be an SCX cartridge where e.g. peptides are eluted by buffers containing a high concentration of non-volatile salts, e.g. KCl, that may quench the mass spectrometric signal and irreversibly pollute the mass spectrometer. This may be combined with a trapping column with C18 material that captures the eluted peptides while the salty eluent may end in a waste container (44) and only after the eluent has switched back to containing no salt will the valve (47) switch and an organic-phase gradient, from a second pump or set of pumps (48), will elute analytes from the trapping column and towards the mass spectrometer.

Re. 2)

Analytes may be eluted from the cartridge either by running an appropriate eluent gradient through the cartridge or by running an aliquot of eluent of an appropriate fixed composition trough the cartridge (an isocratic elution). Both in the case of isocratic elution and gradient elution, it is possible to modify the eluent after the cartridge by adding an additional fluid stream such that the resulting eluent composition favors binding of analytes at the point of the separation column (or trapping column).

Figure 4:
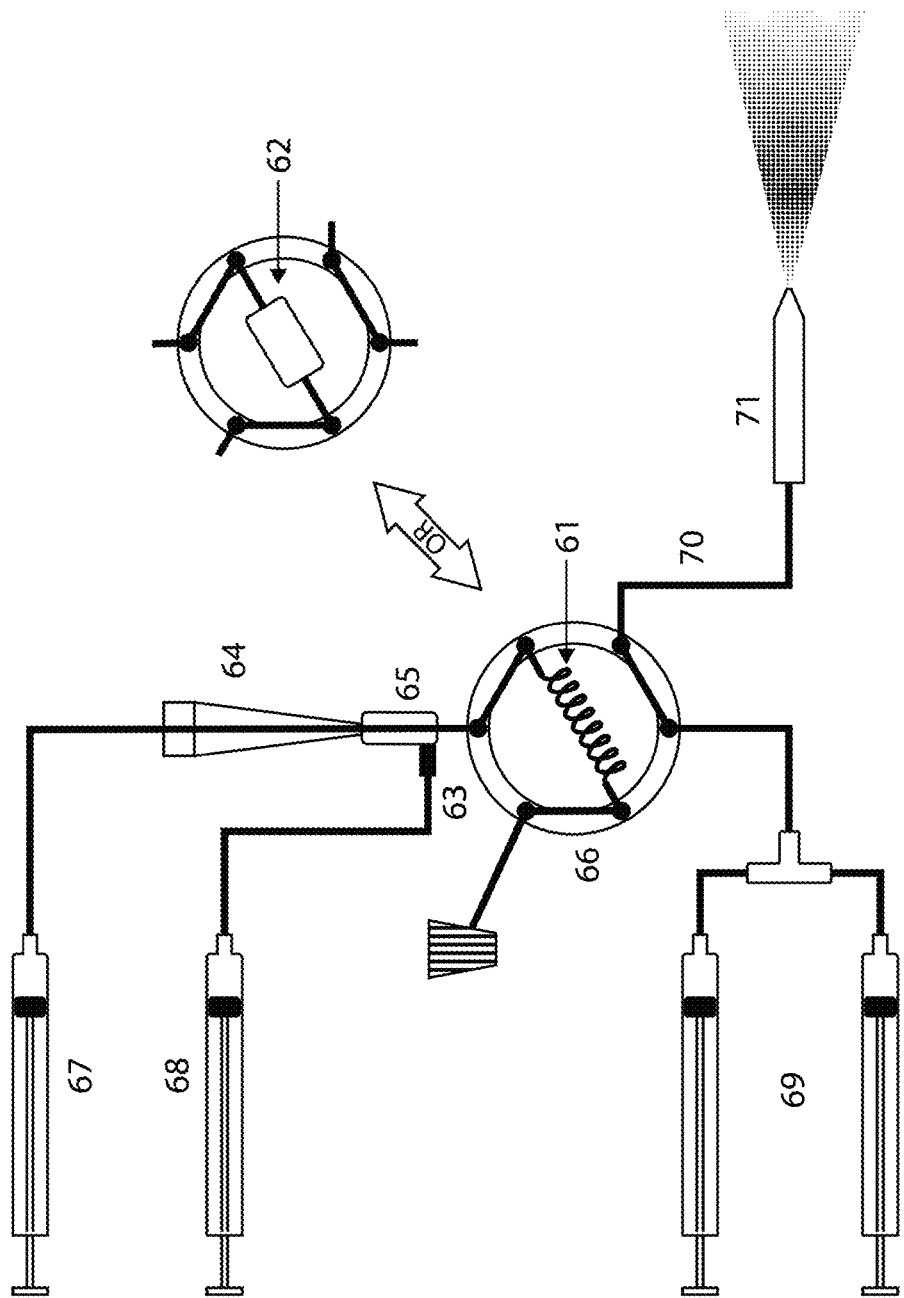
FIG. 4 is plan view of the present invention where an isocratic eluent is used to elute analytes from the cartridge followed by dilution of the eluent before entering into a loop.

FIG. 4 shows a setup where an isocratic eluent from a source [67] is used to elute analytes from the cartridge [64] whereupon the eluent may get diluted e.g. by a factor of ten by adding a make-up flow from another source [68] (e.g a syringe) at a point [63] before entering a loop [61] (please note, that the loop could also in this case be replaced by a trapping column) [62]. The valve [66] is then switched in order to place the loop in-line with a separation column [71] and a gradient is delivered by a pumping system [69] through the loop, forcing the diluted eluent through a conduit [70] onto the separation column where analytes will bind until the gradient elutes each analyte species at the pertinent time. As an example the cartridge sorbent could be C18 material where e.g. a peptide mixture is eluted by a 3 µL aliquot of buffer that is 38% acetonitrile in water; this buffer gets diluted with 27 µL water as it passes through the recipient socket to have a final acetonitrile concentration of 3.8% at which point most peptides will bind to a separation column of C18 material. After the valve has switched position, a gradient going from e.g. 4 to 40% acetonitrile elutes the re-focused peptides and subsequently a portion of the gradient quickly rising to 80% acetonitrile is used to clean the separation column from any remaining sample.

REFERENCES

1. Knierman and Hale (WO2006104905 (A1))
2. Hoerning et al in 2007 (Hørning, O. B., Theodorsen, S., Vorm, O., & Jensen, O. N. (2007). Solid phase extraction-liquid chromatography (SPE-LC) interface for automated peptide separation and identification by tandem mass spectrometry. *International Journal of Mass Spectrometry*, 268(2), 147-157.)
3. Hoerning et al in 2008 (Hørning, O. B., Kjeldsen, F., Theodorsen, S., Vorm, O., & Jensen, O. N. (2008). Isocratic solid phase extraction-liquid chromatography (SPE-LC) interfaced to high-performance tandem mass spectrometry for rapid protein identification. *Journal of proteome research*, 7(8), 3159-3167.)
4. Falkenby et al. in 2014 (Falkenby, L. G., Such-Sanmartin, G., Larsen, M. R., Vorm, O., Bache, N., & Jensen, O. N. (2014). Integrated Solid-Phase Extraction—Capillary Liquid Chromatography (speLC) Interfaced to ESI—MS/MS for Fast Characterization and Quantification of Protein and Proteomes. *Journal of proteome research*, 13(12), 6169-6175.)
5. Binai, N. A., Marino, F., Soendergaard, P., Bache, N., Mohammed, S., & Heck, A. J. (2014). Rapid Analyses of Proteomes and Interactomes Using an Integrated Solid-Phase Extraction—Liquid Chromatography—MS/MS System. *Journal of proteome research*, 14(2), 977-985.

The invention claimed is:

1. A system for separation of analytes in a solution, said system comprising:
    a cartridge enclosing a sorbent for binding the analytes in the solution;
    a recipient socket for receiving the cartridge, and allowing a fluid to flow through the cartridge into the recipient socket, thereby eluting the analytes into the recipient socket;
    a conduit in fluid communication with the recipient socket, said conduit establishing a fluid link to a valve, said valve being switchable between a first valve position and a second valve position, wherein said first valve position provides fluid communication between said recipient socket and a holding-loop without sorbent, wherein said holding-loop is configured to provide low flow resistance at a first flow rate of between 200 nL/min and 50 µL/min enabling elution of the analytes from the cartridge and into said holding-loop at a first pressure of between 1 bar and 50 bar; wherein the second valve position provides fluid communication between said holding-loop and an outlet port to provide for emptying said holding-loop through said outlet port at a second pressure of between 1 bar and 3000 bar and at a second flow rate of between 50 nL/min and 20 µL/min;

a chromatographic column in fluid communication with the outlet port, said chromatographic column provided with another sorbent having a chemical composition that is matched with binding material of the cartridge such that at least some of the analytes eluted from the cartridge will bind to said chromatographic column;

a first pump arrangement configured to provide flow through the cartridge, the recipient socket, and the holding-loop when the valve is provided in the first valve position; and a second pump arrangement configured to provide flow through the holding-loop to the outlet port and the chromatographic column when the valve is in the second valve position.

2. The system of claim 1, wherein the first pressure used to move fluid through the cartridge is less than 5 bar.

3. The system of claim 1, wherein the second flow rate of the liquid that moves the analytes through the outlet port is less than 5 μL/min.

4. The system of claim 1, wherein the second pressure of the liquid that moves the analytes through the outlet port is less than 2000 bar.

5. The system of claim 1, wherein the cartridge is selected from:
a pipette tip with chromatographic resin embedded and fixated therein;
a length of tube, wherein its inner and/or outer surfaces may be cylindrical, conical, spherical or any combination thereof; and
a planar disc.

6. The system of claim 1, wherein the chromatographic column contains C18 reversed phase material.

7. The system of claim 1, wherein the sorbent of the cartridge is selected from C18, C8, C4, hilic, cation-exchange material, anion-exchange material, cellulose, antibodies and derivatives thereof.

8. The system of claim 1, wherein each analyte is eluted in volumes less than 500 μL.

9. The system of claim 1 further comprising one or more pumps that can supply a liquid at any point in-between the recipient socket and the chromatographic column such that an eluent composition is modified so that at least some of the analytes eluted from the cartridge will bind to said chromatographic column.

10. The system of claim 9, wherein the eluent flowing from the cartridge is modified by adding an eluent from the one or more pumps at one or more of the following sites:
integral to the recipient socket,
in-between the recipient socket and the conduit,
in-between the conduit and the valve,
in-between an inlet of the valve and an outlet of the valve, and
in-between the outlet of the valve and the sorbent of the chromatography column.

11. The system of claim 1, wherein the pressure used to move fluid through the cartridge is less than 5 bar.

12. The system of claim 1, wherein the pressure used to move fluid through the cartridge is less than 2 bar.

13. The system of claim 1, wherein the second flow rate of the liquid that moves the analytes through the outlet port is less than 5 μL/min.

14. The system of claim 1, wherein the second flow rate of the liquid that moves the analytes through the outlet port is less than 2 μL/min.

15. The system of claim 1, wherein the second pressure of the liquid that moves the analytes through the outlet port is less than 1000 bar.

16. The system of claim 1, wherein the second pressure of the liquid that moves the analytes through the outlet port is less than 600 bar.

17. The system of claim 1, wherein the second pressure of the liquid that moves the analytes through the outlet port is less than 300 bar.

18. The system of claim 1, wherein each analyte is eluted in volumes less than 200 μL.

19. The system of claim 1, wherein each analyte is eluted in volumes less than 100 μL.

20. The system of claim 1, wherein each analyte is eluted in volumes less than 20 μL.

21. The system of claim 1, wherein said conduit establishing a fluid link to a valve is via a coupling conduit.

22. The system of claim 1, wherein said holding-loop is positioned across the valve.

23. A system for separation of analytes in a solution, said system comprising:
a cartridge enclosing a sorbent for binding the analytes in the solution;
a first pump in fluid communication with an inlet of the cartridge;
a holding-loop without sorbent having low resistance to fluid flow;
a valve having a first position and a second position;
a recipient socket that removably holds the cartridge,
a second pump; and
a chromatographic column having a second sorbent having a chemical composition that is matched with binding material of the cartridge,
wherein the valve, when in the first position, is structured so that the cartridge is in fluid communication between the first pump and the holding-loop so that flow delivered by the first pump elutes analytes from the cartridge under a first pressure to the holding-loop,
wherein the valve, when in the second position, is structured so that the holding-loop is disconnected from fluid communication with the cartridge and is structured so that the holding-loop is in fluid communication between the second pump and the chromatographic column so that fluid delivered by the second pump elutes analytes from the holding-loop under a second pressure to the chromatographic column, the second pressure being higher than the first pressure.

24. The system of claim 23, wherein the cartridge, when the valve is in the second position, is removable from the recipient socket due to the holding-loop being disconnected from fluid communication with the cartridge.

25. The system of claim 23, wherein the second sorbent of the chromatographic column has a chemical composition that is matched with the sorbent of the cartridge.

26. The system of claim 1, wherein the another sorbent of the chromatographic column has a chemical composition that is matched with the sorbent of the cartridge.

* * * * *